(No Model.)
E. L. BABCOCK.
PULLEY.
No. 569,850.     Patented Oct. 20, 1896.
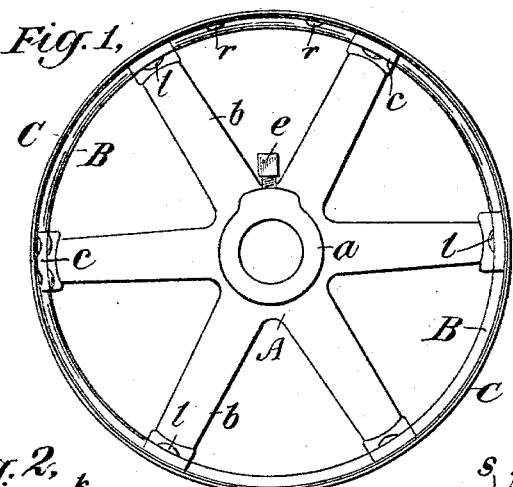
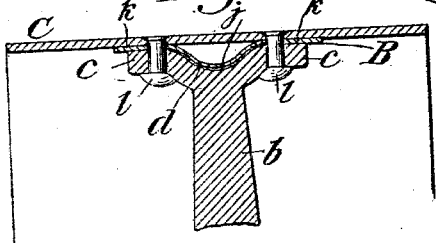
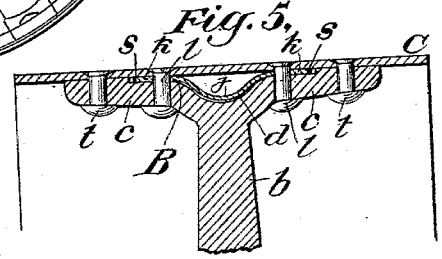
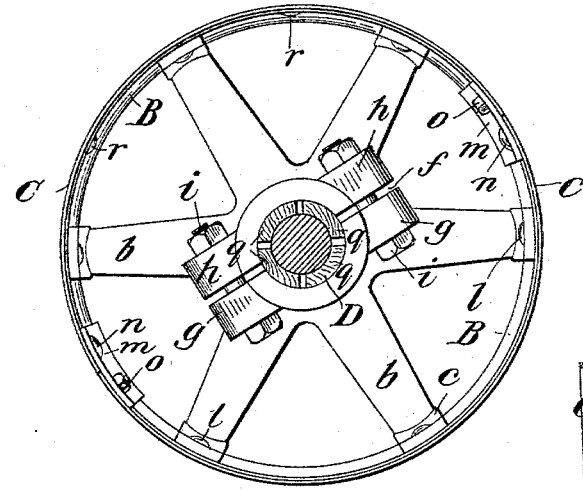
Witnesses:
Inventor:
Erskine L. Babcock
by Gifford & Bull
Attys.

UNITED STATES PATENT OFFICE.

ERSKINE L. BABCOCK, OF CUYAHOGA FALLS, OHIO.

PULLEY.

SPECIFICATION forming part of Letters Patent No. 569,850, dated October 20, 1896.

Application filed September 25, 1895. Serial No. 563,608. (No model.)

*To all whom it may concern:*

Be it known that I, ERSKINE L. BABCOCK, a citizen of the United States, and a resident of Cuyahoga Falls, in the county of Summit and State of Ohio, have invented certain new and useful Improvements in Pulleys, of which the following is a specification.

Heretofore pulleys have been constructed of a cast-iron center or spider combined with a wrought-iron rim secured to the ends of the spokes of the spider, but the deficiency in strength of the rim between the spokes has resulted in the breaking of the lugs on the spokes. Pulleys have also been constructed with a cast-iron rim with the disadvantages of inequalities due to shrinkage and casting. By my invention I overcome the difficulties encountered with both said kinds of pulleys.

In the accompanying drawings, Figure 1 is a side view of an unsplit pulley containing my invention. Fig. 2 is a detail in cross-section on the line $x$, showing the form of the parts at and near the rim. Fig. 3 is a side view of my invention applied to a split pulley. Fig. 4 is a detail showing the construction at the under side of the rim where the split occurs. Fig. 5 is a cross-section showing the same thing as Fig. 2 in a modified form. Fig. 6 is another modification.

My pulley consists of a center or spider A, containing a hub $a$, the spokes $b$, and lugs $c$ at the ends of the spokes, either in the form shown in Fig. 2 or that shown in Fig. 5. The end of each spoke is grooved circumferentially at $d$. For an unsplit pulley the hub is provided with a set-screw $e$ to secure it to the shaft. For a split pulley the hub is split on a line between the spokes, as the line $f$, Fig. 3, and on each side of this line lugs $g$ and $h$ are provided to receive the bolts $i$, whereby the two halves of the hub are bolted together. The spider or half-spider, inclusive of hub, spokes, and lugs, is made of cast-iron cast in one piece.

B is what I call a "crown-piece," and I believe it to be new in the construction of pulleys. In cross-section it consists of an inwardly-bent body $j$, adapted to fit the grooves $d$ at the ends of the spokes, and a flange $k$ on each side of said body. This crown-piece is made of wrought-steel and is constructed from flat strips by being cold-rolled into the form already referred to transversely and into circular form longitudinally. It is then sprung onto the ends of the spokes, so as to occupy the position shown in the drawings.

C is the rim, which is also made of wrought metal rolled into the circular form required and sprung onto the outside of the crown-piece in the position shown in the drawings.

The spider, crown-piece, and rim being assembled, as above described, they are secured together by the bolts or rivets $l$, which pass through the lugs $c$ $k$ and the rim C, and are riveted in that position.

When the pulley is constructed as a split pulley, the crown-piece and the rim are each made in two parts, as shown in Fig. 4. The ends of the two parts abut against each other and are secured in that position by an overlapping interior plate $m$. This plate is permanently secured on one side of the split to the rim and crown-piece by the rivets $n$. On the other side of the split, rivets $o$ pass from the rim inward through the plate $m$ and are provided with nuts on their inner ends, as shown. Other rivets $p$ extend from the rim inward through the crown-piece and the plate $m$ and are also provided with nuts on their inner ends. By the removal of these nuts and of the bolts $i$ the pulley may be divided in half.

D is a wooden bushing which I employ in combination with the split pulley, and which consists of the four sections $q$. By the use of a pulley in the split form in combination with this wooden bushing I obtain in a metal pulley the advantages heretofore possessed by wooden pulleys consisting in adaptability to fit any size shaft, so that the pulley proper can be kept in stock with various sized bushings and thus be sold to fit various sizes of shaft.

In order to still further secure the parts together, I sometimes employ additional rivets $r$ for riveting the crown-piece and the rim together between the spokes.

The lugs $c$ of the spokes may be either in the form shown in Fig. 2, where they do not extend beyond the flanges $k$ of the crown-piece, or they may be as shown in Fig. 5, where they are extended beyond the flanges $k$ of the crown-piece and into contact with the rim on each side of said flanges, rabbets being provided in the lugs $c$ at $s\,s$ to receive said flanges on each side of the groove $d$ to receive the body portion or corrugation $j$ of the crown-piece. In this case the portion of the flanges $c$ extending beyond the flanges $s$ is riveted directly to the rim by the rivets $t$.

Although I have shown the inwardly-bent portion of the crown-piece as of the form $j$, located between the flanges and within the grooves of the spokes, and although this form is by far the preferable construction known to me at the present time, yet I do not, unless so expressed in the claims, desire to be limited to that form, since other forms may be adopted and other locations for the inwardly-bent portion of the crown-piece performing the strengthening function due to the bending of the bent portion and its angular position relatively to the rim. Thus the strengthening function may be performed by a strengthening-flange $j'$ running all around and lying in a radial plane and made in one piece with the flanges $k$, as shown in Fig. 6.

I am aware of the construction shown in Patent No. 298,513 to Fulton and Olsen and that shown in Patent No. 453,075 to Carmody and make no claim to the structure shown in either of said patents, because, although in each of said patents the spokes or center are connected with an inner rim, which is in turn connected with the outer rim, yet in neither of said patents is there a crown-piece interposed between the connections of the spokes or center with the outer rim. In my construction dependence is not placed upon the crown-piece for connecting the spokes with the outer rim, and therefore my crown-piece may be constructed, as it is, of rolled wrought-steel so resilient as to be sprung onto the end of the spokes, and when in that position afford a sufficient strengthener for the wrought-iron rim between the spokes without being of the unyielding and bulky character necessary for constituting a part of the spokes themselves or their connections with the outer rim. Moreover, in my construction no breakage of the crown-piece necessarily disturbs the connection between the center and the outer rim.

I claim—

1. In a pulley, in combination, the cast-metal spider, the wrought-metal rim, bolts connecting the spider with the rim on opposite sides of the central plane of said spider and a crown-piece interposed between said spider and said outer rim and between the bolts which are on opposite sides of said central plane, substantially as described.

2. In a pulley, in combination, the cast-metal center, the wrought-metal rim, bolts connecting the two, and the wrought-metal crown-piece interposed between the center and the rim; said crown-piece being constructed with an inwardly-bent portion, substantially as described.

3. In a pulley, in combination, the cast-metal spider, the wrought-metal rim, bolts connecting the two, and the wrought-metal crown-piece interposed between the same provided with an inwardly-bent portion fitting into a recess in the said spider, substantially as described.

4. In a pulley, in combination, a cast-metal spider, a wrought-metal rim, bolts connecting the two, and a wrought-metal crown-piece interposed between the same; said crown-piece containing an inward corrugation with flanges on each side of said corrugation, substantially as described.

5. In a pulley, in combination, the metal spider, the wrought-metal rim, the crown-piece interposed between the same, the spokes of said spider being provided with lugs extending over the crown-piece and secured to the rim on each side thereof, substantially as described.

6. In a split pulley, in combination, a split cast-metal center, a split wrought-metal rim, bolts connecting the two, and a split wrought-metal crown-piece interposed between the same, substantially as described.

ERSKINE L. BABCOCK.

Witnesses:
F. W. WEIR,
E. D. SCHMIDT.